March 28, 1933.  H. J. KERR ET AL  1,902,862
PRESSURE DRUM
Filed Sept. 27, 1928
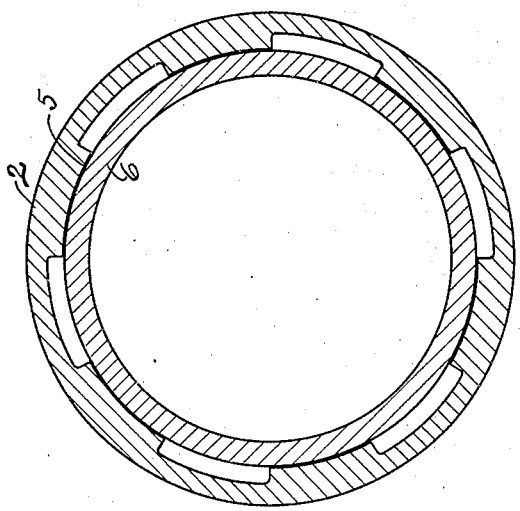
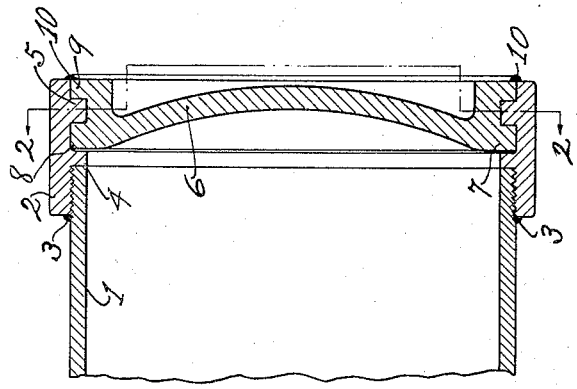
INVENTORS
Howard J. Kerr
George D. Ebbetts
BY
Gifford & Scull
ATTORNEYS Patented Mar. 28, 1933

1,902,862

UNITED STATES PATENT OFFICE

HOWARD J. KERR, OF WESTFIELD, AND GEORGE D. EBBETS, OF KENILWORTH, NEW JERSEY, ASSIGNORS TO THE BABCOCK & WILCOX COMPANY, OF BAYONNE, NEW JERSEY, A CORPORATION OF NEW JERSEY

PRESSURE DRUM

Application filed September 27, 1928. Serial No. 308,824.

This invention relates to a drum or container that is provided with a removable head that will withstand thrust longitudinally of the drum and the danger of leakage is obviated. The invention is especially suited for drums for mercury boilers, but is not restricted to this particular use. It is especially adapted to drums and heads that are subjected to unequal temperature expansion at different points and that must be kept tight.

The invention will be understood from the description in connection with the accompanying drawing in which Fig. 1 is a longitudinal section through one end of a drum showing an illustrative embodiment of the invention; Fig. 2 is a section along the line 2—2 of Fig. 1. In the drawing reference character 1 indicates a drum with an externally threaded end upon which a threaded extension 2 is screwed or otherwise fastened so as to be securely attached to the drum to make a gas tight connection. An annular weld 3 may be made at the inner end of the screw threaded extension when one is used, to prevent leakage from the screw threaded joint even at high pressures. The extension 2 is provided with an internal circumferential rib 4 which is adapted to contact with the end of the drum 1 when the extension 2 is put in place. The extension 2 which may be formed in the metal of the drum itself is also provided with an internal circumferential rib 5 from which sections are cut away as shown in Fig. 2 evenly spaced around the circumference. The sides of this rib lie in a radial plane or approximately so, and preferably form a part of the face of a square screw thread.

A somewhat disc-shaped head 6 to fit into the extension 2 is provided with an inside rib 7 interrupted at intervals around its circumference, and matching the groove 8 behind the rib 5 so that the head 6 can be put in place in the manner common with breech blocks with rib 7 of the head bearing on rib 5 of the drum extension after a partial rotation. When in position the rib 7 does not fill the groove 8 behind the rib 5, but there is radial freedom for expansion, as most clearly shown in Fig. 3. The bearing of rib 7 on rib 5 is on one side only, the side away from the drum. By giving these bearing faces a helical or screw thread character the head is drawn toward the drum as it is rotated and the outer uninterrupted rib 9 of the head is drawn toward the drum extension rib 5 but the rib 7 is free to expand radially or axially in the groove 8 behind the rib 5. The head 6 is preferably made concave on the inside. The joint between the rib or flange 9 and extension 2 at their flush faces is welded as shown at 10 to prevent leakage and the construction prevents stressing and injury of the welding metal by internal pressure or expansion of the metal.

The head 6 can be removed by first removing the weld 10 and then turning the head a slight distance circumferentially and then removing the same longitudinally of the drum. The extension 2 can also be removed by first removing the weld 3 and then unscrewing the same.

With a hot vapor in the drum and in contact with the head most of the drum metal and that of the center of the head will have about the same temperature as the vapor. The outer circumference of the head and the end of the drum extension will be cooler, but each will have about the same temperature as the other and no relative expansion will take place to stress the metal at the weld. This insures that the temperature expansion stresses will not break the weld and cause leakage, and the weld is relieved of all internal pressure by the two interrupted ribs 5 and 7 which carry this head when in operative contact.

We claim:

1. The combination with a container having an opening of a closure arranged to fit within the wall of said opening, an outwardly extending flange on said closure formed so as to lie flush with the surface of the container around said opening, a metal weld closing the seam between said flange and said surface and interlocking flanges on said container and said closure for securing said closure in place.

2. The combination of a drum provided with an interrupted flange, a drum head having an interrupted flange adapted to cooperate with the flange on said drum to hold said head in place, a second flange on said head extending outwardly from said body portion and formed so as to lie flush with the outer end of said drum, and a metal weld closing the seam between said outer flange and said drum.

3. In combination, a container having an inner periphery and near the open end thereof a series of annually arranged radially extending spaced closure engaging members, a closure having similar annularly arranged peripheral members passing through the spaces between said previously mentioned members, said closure being movable rotatively to engage its peripheral members on the container side of said closure engaging members, and cooperating exteriorly located contiguous surfaces provided with a weld closing the joint in a fluid-tight manner, the said annularly arranged members relieving the weld of any thrust exerted by pressure within the container.

HOWARD J. KERR.
GEORGE D. EBBETS.